United States Patent Office 2,817,669
Patented Dec. 24, 1957

2,817,669
SYNTHESIS OF ORGANIC OXYGEN-CONTAINING COMPOUNDS

Robert P. Bowditch and Helmut William Schulz, Charleston, W. Va., assignors to Union Carbide Corporation, a corporation of New York No Drawing. Application October 7, 1953
Serial No. 384,757

8 Claims. (Cl. 260—343.5)

This invention relates to the synthesis of organic oxygen-containing compounds and more particularly, is directed to a process for the production of organic oxygen-containing compounds employing as a catalyst for the reaction a cobalt compound which is insoluble in the reactants and the products of the reaction. More specifically, this invention contemplates the use of a cobalt oxide catalyst in order to effect the reaction between compounds containing olefinic unsaturation and carbon monoxide to yield organic oxygen-containing compounds.

Heretofore, the prior art has employed various catalysts for catalyzing the reaction between olefinic compounds, carbon monoxide and hydrogen such as, for example, cobalt carbonyl as well as other cobalt containing compounds. The cobalt carbonyl catalyst used in the prior art, while being advantageous in many ways, is also very undesirable in many respects, one such undesirable characteristic being the separate generation and handling of the toxic and unstable cobalt carbonyl. Another well known catalyst employed, in this type of reaction, by the prior art is the Fischer-Tropsch cobalt-thoria-magnesia-kieselguhr catalyst. The use of this type of catalyst requires a special high temperature reduction in a hydrogen cycle during which a decrease in surface area of the catalyst is an unfavorable characteristic. It requires a cumbersome quenching procedure to protect the pyrophoric metal against oxidation upon contact with air; it entails more costly and considerably less reproducible catalyst preparations; and it complicates the recycling of unreacted cobalt by necessitating the elimination of silica and other solid inerts.

According to this invention, it has been found that cobalt oxide provides a catalyst for the process which greatly simplifies the process by eliminating such difficult handling problems as the preparation, high temperature reduction, quenching and pumping of pyrophoric and abrasive Fischer-Tropsch cobalt-thoria-magnesia-kieselguhr catalyst; or the separate generation and handling of the toxic and unstable cobalt carbonyl.

Other prior art procedures employ various dissolved-type metal salts to catalyze the reaction between an organic compound containing an olefinic linkage and carbon monoxide and hydrogen. The soluble metal salts employed in prior art procedures include, for example, compounds such as the chlorides, acetates, naphthenates, and phenolates of cobalt, copper and nickel. The prior art also employs combinations of the above-mentioned catalysts either alone or in conjunction with promoters or buffers such as, for example, potassium acetate and sodium propionate. While the prior art procedures, referred to above, employ catalysts which afford acceptable yields of organic oxygen-containing compounds, they suffer one serious disadvantage in that the catalysts comprising soluble metal salts result in the release of corrosive acidic contaminants which complicate the product recovery procedure. The process of this invention in contradistinction to prior art procedures employs an insoluble cobalt oxide catalyst which requires no special handling and which does not generate harmful contaminants. The greater inherent simplicity of the cobalt oxide catalyst of this invention, which overcomes the special problems presented when a Fischer-Tropsch or when a dissolved catalyst is employed, provides a very distinct and useful improvement in the art.

Thus, this invention is directed to a process for the production of organic oxygen-containing compounds which comprises reacting an organic compound containing olefinic unsaturation with carbon monoxide and hydrogen in the presence of a cobalt oxide catalyst, and an object of this invention is to provide an improved method for the preparation of organic oxygen-containing compounds from compounds containing olefinic unsaturation and carbon monoxide and hydrogen, and more particularly, this invention has as one of its objects the provision of an improved process for the synthesis of aldehydes, such as butyraldehyde and isobutyraldehyde and other organic oxygen-containing compounds from olefins, such as propylene, carbon monoxide and hydrogen in the presence of a cobalt oxide catalyst. A further object of this invention is to provide a catalyst which is relatively inert, very stable and low in cost and thus provide important economic advantages in large scale implementation of the process.

Compounds containing olefinic unsaturation suitable for use in the process of this invention include alkene hydrocarbons, esters of unsaturated acids and the like, such as, for example, ethylene, propylene, butylene, pentenes, hexenes, heptenes, diisobutylene, tripropylene, triisobutylene, methylacrylate, ethyl crotonate, allylidene diacetate, as well as olefinic hydrocarbon feeds from oil and gas cracking operations.

In the practice of this invention the composition of the reactants comprising carbon monoxide, hydrogen, and an organic compound containing olefinic unsaturation should provide approximately stoichiometric quantities to insure a complete reaction. In the production of butyraldehydes, for example, high yields of product are obtained when the mol ratio of $H_2$—CO synthesis gas to propylene is maintained in the range of from about 1.1:1 to about 1.3:1, however, substantial excess of any reactant may be employed if desired.

The process of this invention may be carried out at temperatures in the range 130° C. to 250° C. but the choice of an optimum operating temperature varies with the reactivity of the unsaturated compound subjected to hydroformylation.

Superatmospheric pressures are advantageously employed in the practice of this invention and more preferably, superatmospheric pressures in the range from 2000 to 9000 pounds per square inch afford acceptable conversions of olefinic compounds to oxygen-containing compounds.

The cobalt oxide catalyst may be suitably prepared by heating a wet filter cake of cobalt carbonate containing approximately fifty percent water for several hours to drive off the water. The dry material is then subjected to a temperature in the range 700° F. to 800° F. for eight hours and after cooling is ground down to a particle size of approximately one micron.

The cobalt oxide catalyst prepared in the above-described manner may be utilized most effectively in the reaction by slurrying in a liquid medium such as, for example, the olefinic feed stock, mineral oil, toluene, butanol, the crude converter product, or any suitable suspension medium. Desirably, the catalyst is introduced as a 1 to 3 percent slurry in the suspension medium in such quantity that the rate of feed in pounds of catalyst per pound of olefinic compound fed to the reaction falls in the range of from about 0.001 to about 0.01.

The amount of cobalt oxide catalyst used in the process of the invention is not a critical feature of the invention, but the amount necessary to catalyze the reaction will vary with the reactivity of the olefinic feed. In the hydroformylation of propylene, for example, it has been found that acceptable conversions of olefinic compound to oxygen-containing compounds are afforded if the amount of catalyst continuously introduced with the reactants to the reaction vessel falls in the range of from about 0.15 percent to about 0.30 percent, by weight, based on the weight of olefinic compound charged.

Broadly, this invention is directed to the production of organic oxygen-containing compounds by effecting the reaction between an organic compound containing olefinic unsaturation and synthesis gas comprising carbon monoxide and hydrogen in the presence of a cobalt oxide catalyst at an elevated temperature and pressure.

One of the specific aspects of this invention is directed to a process for the production of aldehydes, such as butyraldehyde and isobutyraldehyde which comprises reacting an olefin, such as propylene, with carbon monoxide and hydrogen in the presence of a cobalt compound, which is insoluble in the reactants and reaction products.

The invention may be practiced by heating the reactants in any suitable pressure-resistant vessel, such as an autoclave or converter. For reactions involving corrosive reactants, such as unsaturated acids, the steel pressure vessel may be suitably lined with a corrosion resistant metal, such as stainless steel, Hastelloy B, or silver. The process may be carried out batch-wise or continuously, as desired. In the continuous process the reactants may be introduced at one or more points within the reaction vessel if desired.

The following Table I illustrates a series of experiments in which propylene was subjected to the action of carbon monoxide and hydrogen in the presence of the cobalt oxide catalyst.

The reactants were mixed together in desired ratios and preheated before being introduced into the reaction vessel at selected temperatures and pressures while the ground cobalt oxide catalyst, slurried in mineral oil, was pumped into the reaction vessel in such a manner that the catalyst feed rate was maintained in the range of from about 0.0010 to about 0.0040 pound of catalyst per pound of propylene fed to the reaction vessel.

The products and unreacted gases were removed from the top of the reaction vessel to be subsequently distilled and analyzed.

TABLE I

| Run | Pressure (p. s. i.) | Temp. (°C.) | Mol Ratio $H_2:CO:C_3H_6$ | Propylene Purity (Percent) | Propylene space velocity, v./v./hr. | Catalyst, lb./lb. $C_3H_6$ | Propylene conversion (Percent) | Efficiencies | | |
|---|---|---|---|---|---|---|---|---|---|---|
| | | | | | | | | Butyraldehydes (Percent) | Butyraldehydes and butanols (Percent) | Other liquid products |
| 1 | 5,000 | 204 | 1.24:1.32:1.0 | 84.0 | 204 | 0.0023 | 95.8 | 64.0 | 74.6 | 20.8 |
| 2 | 5,000 | 213 | 1.17:1.27:1.0 | 86.8 | 437 | 0.0032 | 75.8 | 78.4 | 81.0 | 5.9 |
| 3 | 5,000 | 204 | 1.41:1.52:1.0 | 88.8 | 271 | 0.0018 | 98.9 | 65.7 | 79.3 | 11.4 |
| 4 | 5,000 | 205 | 1.21:1.26:1.0 | 88.2 | 439 | 0.0016 | 83.8 | 83.5 | 86.3 | 1.5 |
| 5 | 5,000 | 206 | 1.27:1.29:1.0 | 87.2 | 347 | 0.0016 | 95.0 | 80.5 | 85.5 | 8.2 |
| 6 | 4,000 | 212 | 1.15:1.24:1.0 | 90.1 | 448 | 0.0030 | 46.7 | 82.1 | 83.0 | 8.0 |
| 7 | 4,000 | 208 | 1.14:1.31:1.0 | 84.8 | 412 | 0.0022 | 47.3 | 82.1 | 83.1 | 4.8 |
| 8 | 4,500 | 201 | 1.07:1.18:1.0 | 85.0 | 441 | 0.0026 | 69.6 | 86.0 | 87.4 | 6.1 |
| 9 | 5,500 | 203 | 1.02:1.18:1.0 | 82.6 | 424 | 0.0023 | 82.1 | 75.0 | 77.5 | 13.6 |
| 10 | 6,000 | 216 | 1.25:1.51:1.0 | 96.8 | 505 | 0.0017 | 98.4 | 68.8 | 76.3 | 13.5 |
| 11 | 6,000 | 215 | 1.53:1.72:1.0 | 86.2 | 424 | 0.0020 | 98.7 | 73.9 | 79.0 | 16.2 |
| 12 | 6,000 | 215 | 1.34:1.43:1.0 | 83.3 | 424 | 0.0020 | 99.1 | 64.9 | 73.6 | 13.9 |
| 13 | 5,000 | 213 | 1.17:1.27:1.0 | 86.8 | 437 | 0.0032 | 75.8 | 78.4 | 81.0 | 5.9 |
| 14 | 5,000 | 205 | 1.21:1.26:1.0 | 88.2 | 439 | 0.0016 | 83.8 | 83.5 | 86.3 | 1.5 |
| 15 | 4,000 | 209 | 1.17:1.17:1.0 | 88.1 | 224 | 0.0020 | 63.6 | 80.2 | 80.2 | 10.8 |
| 16 | 4,000 | 206 | 1.17:1.17:1.0 | 89.3 | 239 | 0.0019 | 95.0 | 78.5 | 85.1 | 10.6 |
| 17 | 4,000 | 206 | 1.27:1.30:1.0 | 88.5 | 258 | 0.0018 | 98.9 | 72.1 | 80.0 | 12.9 |
| 18 | 4,500 | 202 | 1.41:1.74:1.0 | 86.4 | 257 | 0.0019 | 99.2 | 74.1 | 86.0 | 11.0 |
| 19 | 4,500 | 206 | 1.18:1.25:1.0 | 86.6 | 217 | 0.0018 | 96.9 | 78.9 | 82.0 | 14.8 |
| 20 | 5,000 | 204 | 1.24:1.32:1.0 | 84.0 | 204 | 0.0023 | 95.9 | 64.0 | 74.6 | 20.8 |
| 21 | 5,000 | 204 | 1.41:1.52:1.0 | 88.8 | 271 | 0.0018 | 98.9 | 65.7 | 79.3 | 11.4 |
| 22 | 5,500 | 198 | 1.31:1.41:1.0 | 85.1 | 258 | 0.0016 | 99.0 | 67.5 | 77.0 | 11.8 |
| 23 | 5,000 | 210 | 1.22:1.33:1.0 | 86.0 | 207 | 0.0025 | 97.9 | 61.1 | 66.9 | 24.0 |
| 24 | 6,000 | 215 | 1.18:1.21:1.0 | 94.7 | 279 | 0.0022 | 95.6 | 61.1 | 73.6 | 19.4 |
| 25 | 6,000 | 204 | 1.40:1.59:1.0 | 80.8 | 212 | 0.0024 | 99.2 | 62.6 | 72.4 | 17.5 |

The following examples illustrate the general applicability of the process of this invention to other unsaturated compounds other than propylene.

*Example I*

A slurry of 0.5 percent cobalt oxide in triisobutylene was introduced into a high pressure reaction vessel at a liquid space velocity of 1.16 hours$^{-1}$ and at a temperature of 220° C. An equimolar carbon monoxide-hydrogen gas mixture was passed through the liquid under a system pressure of 6000 pounds per square inch. Analysis of the liquid effluent from the reactor indicated that the yield of $C_{13}$ aldehyde and alcohol was 35 percent on the basis of the triisobutylene fed to the reactor.

*Example II*

Five hundred and fifty grams of ethyl crotonate in 275 grams of an inert diluent was reacted with an equimolar mixture of carbon monoxide and hydrogen at 155° C. and 4500 pounds per square inch pressure, using 55 grams of cobalt oxide as a catalyst. Distillation of the crude reaction product and chemical analyses of the fractions indicated a 99 percent conversion of the ethylcrotonate and a 55 percent yield of hydroformylation product based on the ethyl crotonate charged. The hydroformylation products included delta-valerolactone, ethyl 5-hydroxyvalerate, ethyl 2-formylbutyrate and ethyl 4-formylbutyrate.

*Example III*

A slurry consisting of 30 grams of cobalt oxide, 80 grams of toluene, and 3050 grams of allylidene diacetate was introduced into a high pressure vessel through which an equimolar carbon monoxide-hydrogen gas mixture was passed under a system pressure of 6000 pounds per square inch. The gas cycle was maintained separately and was also used to agitate the liquid phase in the reactor. The slurry was fed to the reactor at a liquid space velocity of 1.3 hours$^{-1}$ and reaction took place at 145° C., the crude reaction product being removed continuously through a liquid overflow line. The yield of 4,4-diacetoxybutyraldehyde was 47% on the basis of the allylidene diacetate charged to the reactor.

*Example IV*

An olefinic hydrocarbon feed consisting principally of $C_4$ mono-olefins was introduced to a high pressure reaction vessel, carbon monoxide and hydrogen gas mixture being added as a separate feed. The gas space velocities of the hydrocarbon, carbon monoxide and hydrogen were 221, 242 and 351 respectively. The catalyst, cobalt oxide, was introduced as a 1 to 2 percent slurry in mineral oil at a rate sufficient to provide 0.0023 pound of cobalt oxide per pound of olefin. The three feed systems were passed through the reactor at 205° C. under a system pressure of 6000 pounds per square inch. The product contained 87 percent pentanals and pentanols on an oil and gas free basis, representing a yield of 82.7 percent based on the hydrocarbon feed.

What is claimed is:

1. A process for the production of organic oxygen-containing compounds which comprises reacting an olefinic hydrocarbon compound containing from 2 through 12 carbon atoms with carbon monoxide and hydrogen in the presence of a cobalt oxide catalyst suspended in a liquid medium at a temperature in the range of 130° C. to 250° C. under superatmospheric pressures in the range 2000 to 9000 pounds per square inch, said cobalt oxide catalyst being derived from the thermal decomposition of cobalt carbonate at a temperature in the range of from 700° F. to 800° F. and having a particle size of approximately one micron.

2. A process for the production of organic oxygen-containing compounds which comprises reacting an olefinic compound selected from the group consisting of alkenes containing from 2 through 12 carbon atoms, lower alkyl esters of lower alkenoic acids and allylidene diacetate with carbon monoxide and hydrogen in the presence of a cobalt oxide catalyst suspended in a liquid medium at a temperature in the range of 130° C. to 250° C. under superatmospheric pressures in the range 2000 to 9000 pounds per square inch, said cobalt oxide catalyst being derived from the thermal decomposition of cobalt carbonate at a temperature in the range of from 700° F. to 800° F. and having a particle size of approximately one micron.

3. The process of claim 2 in which the olefinic compound is propylene.

4. The process of claim 2 in which the olefinic compound is tripropylene.

5. The process of claim 2 in which the olefinic compound is triisobutylene.

6. The process of claim 2 in which the olefinic compound is allylidene diacetate.

7. The process of claim 2 in which the olefinic compound is ethylcrotonate.

8. The process of claim 2 in which the olefinic compound is an olefinic hydrocarbon feed consisting principally of $C_4$ mono-olefins.

References Cited in the file of this patent

UNITED STATES PATENTS

| | | |
|---|---|---|
| 2,564,130 | Schreyer | Aug. 14, 1951 |
| 2,627,527 | Connolly | Feb. 3, 1953 |
| 2,706,206 | Owen et al. | Apr. 12, 1955 |
| 2,736,750 | Catterall | Feb. 28, 1956 |

OTHER REFERENCES

Natta et al.: C. Abstracts 41, 708g (1947).